United States Patent [19]

Sutou et al.

[11] Patent Number: 4,604,036

[45] Date of Patent: Aug. 5, 1986

[54] TORQUE CONTROL APPARATUS FOR ENCLOSED COMPRESSORS

[75] Inventors: Masatsune Sutou, Ota; Yoshihisa Uneyama, Tochigi, both of Japan

[73] Assignee: Hitachi, Ltd., Tokyo, Japan

[21] Appl. No.: 641,675

[22] Filed: Aug. 17, 1984

[30] Foreign Application Priority Data

Sep. 9, 1983 [JP] Japan ................... 58-146963

[51] Int. Cl.⁴ .............. F04B 49/00; F04B 49/06; F04B 49/10; F25B 1/04
[52] U.S. Cl. ........................ 417/18; 417/32; 417/42; 417/45; 62/228.3; 62/228.4
[58] Field of Search ............. 417/1, 18, 19, 20, 22, 417/32, 42, 43, 45; 62/228.3, 228.4

[56] References Cited

U.S. PATENT DOCUMENTS

| | | | |
|---|---|---|---|
| 2,985,010 | 5/1961 | Piltz | 417/1 |
| 4,015,182 | 3/1977 | Erdman | 62/228.4 |
| 4,326,837 | 4/1982 | Gilson | 417/22 |
| 4,407,139 | 10/1983 | Ide et al. | 62/215 |

FOREIGN PATENT DOCUMENTS

| | | | |
|---|---|---|---|
| 2,429,456 | 1/1976 | Fed. Rep. of Germany | 418/63 |
| 2437559 | 2/1976 | Fed. Rep. of Germany | 418/63 |

Primary Examiner—William L. Freeh
Attorney, Agent, or Firm—Antonelli, Terry & Wands

[57] ABSTRACT

A torque control apparatus for enclosed compressors wherein a load torque, applied to an enclosed compressor, is detected by a position detector provided on the rotating portion of the compressor and a temperature detector provided in a refrigeration cycle. A voltage or current supplied to the compressor is controlled in accordance with the load torque to control the motor output torque of the compressor.

7 Claims, 5 Drawing Figures

TORQUE CONTROL APPARATUS FOR ENCLOSED COMPRESSORS

BACKGROUND OF THE INVENTION

The present invention relates to enclosed compressors, and, more particularly, to a torque control apparatus for enclosed compressors.

In, for example, U.S. Pat. No. 3,130,902, a rotary compressor of the aforementioned type is disclosed; however, a disadvantage of this proposed construction resides in the fact that, by virtue of such construction, a rotary portion thereof vibrates thereby resulting in the compressor being subjected to adverse vibrations.

An object of the present invention resides in providing an enclosed compressor which is free from vibration by making a difference between the load torque and motor output torque equal to zero, that is, by removing a vibration source in a conventional enclosed compressor.

In order to attain the above object, according to the present invention, the difference between the load torque and motor output torque is equalized to zero by controlling the output of a motor so that the motor output torque becomes equal to the load torque in synchronism with every change in load torque at a period when the rotating portion of the compressor is turned once. To control the output of the motor, a load, applied to the compressor, is detected by the compressor or a refrigeration cycle, a detection signal is processed by a control unit formed of a microcomputer or the like to obtain an instruction, and a voltage or current supplied to the motor is controlled or adjusted by the instruction to control the motor output torque.

The above and other objects, features and advantages of the present invention will be apparent from the following detailed description of the preferred embodiments of the invention taken in conjunction with the accompanying drawings, in which.

Figure 1:
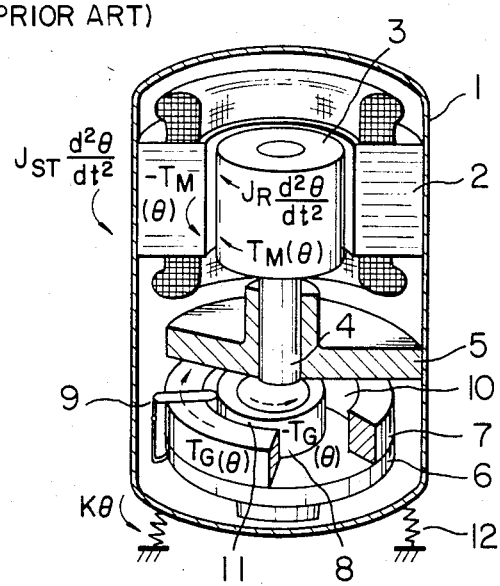
FIG. 1 is a sectional view showing the structure of a conventional enclosed compressor.

Referring now to the drawings wherein like reference numerals are used throughout the various views to designate like parts and, more particularly, to FIG. 1, according to this figure, a conventional compressor of the type disclosed in, for example, aforementioned U.S. Pat. No. 3,130,902, includes a casing 1 for accommodating motor elements and compression elements, with a stator 2 being fixed to the casing 1. A shaft is pressed into and fixed to a rotor 3, with a main bearing 5 being fixed to the casing 1 for supporting the shaft 4, an end bearing 6 is also provided for supporting the shaft 4, with a cylinder block 7 being held between the main bearing 5 and the end bearing 6. A roller 8 is fitted into the crank portion of the shaft 4, with a vane being provided for partitioning a cylinder chamber into a suction chamber 10 and a compression chamber 11, with a vibration proof member also being provided for supporting the compressor.

In the above described enclosed compressor, a high-pressure gas in the compression chamber 11 produces a counter clockwise load torque $-T_G(\theta)$ for the shaft 4, and produces a clockwise torque $T_G(\theta)$ for the cylinder block 7. The torque $T_G(\theta)$ is determined mainly by a delivery pressure $P_d$ and a suction pressure $P_s$. At a rotating portion including the rotor 3 and the shaft 4, the load torque $-T_G(\theta)$ is balanced by the motor output torque $T_M(\theta)$ given by the stator 2 and the inertia torque $J_R(d^2\theta/dt^2)$ of the rotating portion, where $J^R$ represents the moment of inertia of the rotation portion and $d^2(\theta)/d_t2$ represent the angular acceleration of the rotating portion whose rotational speed varies. The balance of the torque is represented by the following relationshp:

$$J_R(d^2\theta/dt^2) + T_M(\theta) = T_G(\theta)$$

Figure 2:
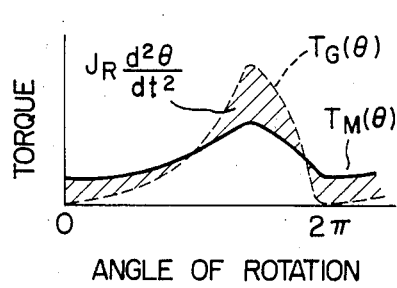
FIG. 2 is a graphical illustration of torque curves on the rotating portion side of the compressor shown in FIG. 1.

It is to be noted that the damping term for the shaft is omitted in the above noted relationship since such term is negligible. FIG. 2 provides an example of the relationship between the angle of rotation and each of the torques $T_G(\theta)$ and $T_M(\theta)$ at a period when the rotating position is turned or rotated once. As shown in FIG. 2, in a range of rotational angle where $T_G(\theta) > T_M(\theta)$ the rotational speed of the rotating portion is reduced at a rate of $d^2\theta/dt^2$, and the interia torque $J_R(d^2\theta/dt^2)$ is released to compensate a torque difference of $T_G(\theta) - T_M(\theta)$. While in a range of rotational angle where $T_G(\theta) < T_M(\theta)$, the rotational speed of the rotating portion is increased at a rate of $d^2\theta/dt^2$ and thus a torque difference $T_M(\theta) - T_G(\theta)$ is given to and stored in the rotating portion. Consequently, the rotational speed of the rotating portion increases and decreases in a period when the rotating portion is turned once and, therefore, the rotating portion vibrates.

While, on the non-rotational side, including the stator 2, cylinder block 7, main bearing 5, and end bearing 6, each fixed to the casing, a load torque $T_G(\theta)$ and a motor output torque $-T_M(\theta)$ appear as the reaction of the load torque $-T_G(\theta)$ and motor output torque $T_M(\theta)$ at the rotating portion, and the torque difference $T_G(\theta) - T_M(\theta)$ appears similarly to the rotating portion. However, on the non-rotational side, the torque difference $T_G(\theta) - T_M(\theta)$ is balanced by an inertia torque $J_{ST}(d^2\theta/dt^2)$ which is produced when a non-rotational body having the moment of inertia $J_{ST}$ is turned so as to have an angular acceleration $d^2\theta/dt^2$, and and restoring torque $K.\theta$ which is produced when the vibration-proof member 12 is rotated by an angle $\theta$. The above mentioned balance is expressed by the equation $$J_{ST}(d^2\theta/dt^2) + K.\theta = T_G(\theta) - T_M(\theta).$$

Figure 3:
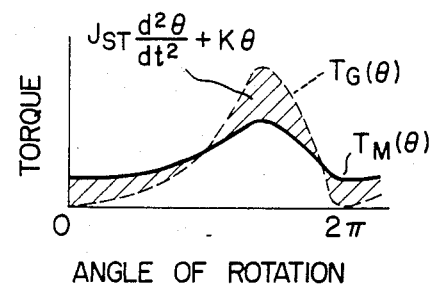
FIG. 3 is a graphical illustration of torque curves on the non-rotational side of the compressor shown in FIG. 1.

FIG. 3 provides a graphical illustration of the relationship between the three quantity $J_{ST}(d^2\theta/dt^2) + K.\theta$, $T_M(\theta)$ and $T_G(\theta)$ at a period when the rotating portion is turned once. As shown in FIG. 3, the torque difference $T_G(\theta) - T_M(\theta)$ takes positive and negative values in a period when the rotation portion is turned once. That is, the torque difference acts as a vibration generating force, and, the whole of the non-rotational body is rotated through an angle $\theta$ or, in otherwords, the non-rotational body vibrates.

As noted hereinabove, in the conventional closed compressor, the torque differences $T_G(\theta) - T_M(\theta)$ acting as a vibration source inevitably appears on the non-rotational side and, consequently, no vibration-proof means can prevent the compressor from vibrating.

Figure 4:
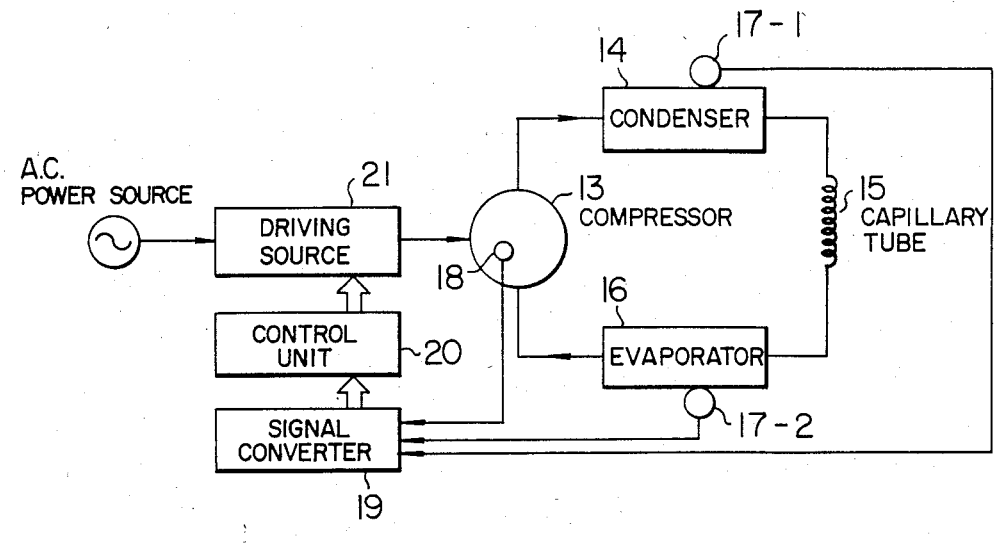
FIG. 4 is a schematic view of an embodiment of a torque control system for enclosed compressors according to the present invention.

As shown in FIG. 4, in accordance with the present invention, a refrigeration cycle with a torque control system for an enclosed compressor includes a compressor 13, a condenser 14, a capillary tube 15, and an evaporator 16. Detectors 17-1, 17-2 are provided for detecting information on the load applied to the compressor 13, i.e., a pressure on the delivery side, with a position detector 18 being provided for detecting a rotational position of the rotating portion of the compressor 13. A signal converter 19 carries out an analog-to-digital conversion for each of the signals from the detector 17-1, 17-2, and position detector 18, with a control unit 20, formed as a microcomputer or the like, being adapted to received the output signals from the signal converter 19. Each of the detectors 17-1, 17-2 is formed as a temperature sensor such as a thermistor, with the position detector 18 being formed as, for example, a rotary encoder.

The torque $T_G(\theta)$ is prestored in the control unit 20, with the torque $T_G(\theta)$ being determined in accordance with the following relationship:

$$T_G = (P_C - P_S) \cdot S \cdot T,$$

where:
$P_C$ represents a pressure in the cylinder independence upon a delivery pressure $P_d$;
S represents an area of the shaft at which the torque $T_G$ is applied; and
T represents a distance between a center axis of the shaft and the point of action of a differential pressure.

As shown in FIGS. 2, 3 the torque $T_G$ is calculated by the control unit 20 on the basis of data with respect to the delivery pressure $P_d$ and suction pressure $P_s$ which are supplied from the detector 17-1, 17-2 every moment. Furthermore, motor output torque, corresponding to the torque $T_G$ thus calculated, is calculated as a function of the rotational position of the motor, using position data from the position detector 18. Electric power supplied from a driving source 21 to the compressor 13 is adjusted in synchronism with a change in torque $T_G$, on the basis of an instruction issued from the control unit 20.

In the above described embodiment of the invention, information on a load applied to the compressor 13 is detected by the detectors 17-1 17-2 which are provided on the parts included in the refrigeration cycle, and the rotational position of the rotating portion of the compressor 13 is detected by the position detector 18. Signals from the detectors 17-1, 71-2, and position detector 18 are transferred to the control unit 20 through the signal converter 19. Both the magnitude of the load torque applied to the compressor 13 in a period when the rotating portion is turned once, and a time the load torque is applied to the compressor 13, are calculated by the control unit 20 on the basis of the above signals, and an instruction thus obtained is sent from the control unit 20 to the driving source 21 to control a voltage or current supplied to the compressor. If the compressor 13, thus controlled during the rotating portion is turned once, the motor output torque $T_M(\theta)$ is made equal to the load torque $T_G(\theta)$ in synchronism with every change in load torque, and therefore the torque $T_M(\theta)$ and torque $T_G(\theta)$ are well-balanced. Accordingly, the vibration generating torque $T_G(\theta) - T_M(\theta)$ is made equal to zero both on the rotating portion side and on the non-rotational side. That is, the vibration generating source is removed, and thus a vibration-free, enclosed compressor can be obtained.

Figure 5:
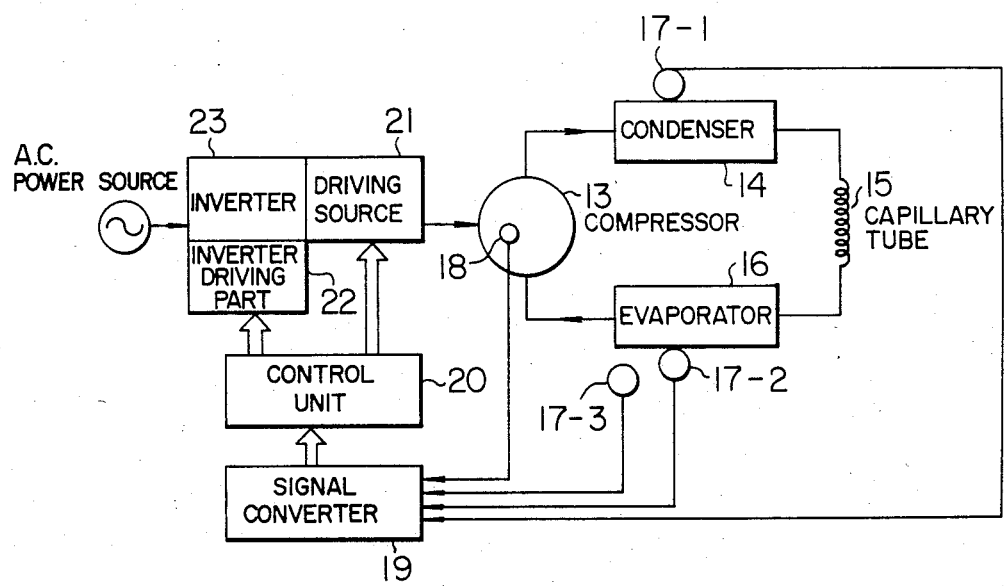
FIG. 5 is a schematic view of another embodiment of a torque control system for enclosed compressors according to the present invention.

In the torque control apparatus of FIG. 5, it is possible to control the number of revolutions of the rotating portion in addition to the function of controlling the motor output torque. As shown in FIG. 5, a detector 17-3 is provided for detecting a temperature around the evaporator 16 to obtain information on a refrigerating capacity required for the compressor 13, with an inverter driving part, 22 and an inverter 23 also being provided. The control unit 20 issues an instruction for controlling the inverter 23, on the basis of a signal from the detector 17-3, and thus the number of revolutions of the rotating portion corresponds to the required refrigerating capacity to save electric power. That is, according to the embodiment of FIGS. 4 and 5, the number of revolutions of the rotating portion and the load torque can be controlled in accordance with a load capacity, and thus an excellent enclosed compressor can be obtained which is small in power consumption and free from vibration.

As has been explained in the foregoing, according to the present inention, a voltage or current supplied to an enclosed compressor is controlled by a control system so that the motor output torque is made equal to the load torque in synchronism with every change in the load torque for a period when the rotating portion of the compressor is turned once, and therefore a difference between the load torque and motor output torque which acts as the vibration generating torque for the compressor, can be made equal to zero. Thus, a vibration-free, enclosed comppressor can be obtained.

We claim:
1. A torque control apparatus for a compressor, the torque control apparatus comprising:
first detecting means for detecting information on a load applied to the compressor;
second detecting means for detecting a rotational position of a rotating portion of the compressor;
first control means for calculating a magnitude of a load torque and a generation time thereof applied to said compressor in dependence upon a first output from said first detecting means and a second output from said second detecting means applied to said first control means;
an AC power source means; and
second control means connected between said power source means and said compressor for controlling an output from said power source means applied to a motor for driving said compressor in response to said magnitude of the load torque thereby controlling an output torque of said motor.

2. A torque control apparatus according to claim 1, wherein said first detecting means includes a temperature sensor.

3. A torque control apparatus for a compressor, the torque control apparatus comprising:
a refrigeration cycle including a compressor, a condenser, and an evaporator connected to each other in series;
first detecting means for detecting the temperature of said condenser and said evaporator;
second detecting means for detecting a rotational position of a rotating portion of said compressor;

first control means for calculating a magnitude of a load torque and a generation time thereof applied to said compressor in dependence upon the first output from said first detecting means and a second output from said second detecting means applied to said first control means;

an AC power source means; and second control means connected between said power source means and said compressor for controlling an output from said power source means, applied to a motor for driving said compressor, in response to said magnitude of the load torque thereby controlling an output torque of said motor.

4. A torque control apparatus for a compressor, the torque control apparatus comprising:

first detecting means for detecting information on a load applied to the compressor;

second detecting means for detecting a rotational position of a rotating portion of said compressor;

third detecting means for detecting information on a refrigeration capacity required for the compressor;

first control means for calculating a magnitude of a load torque and a generation time thereof applied to said compressor on the basis of the first output from said first detecting means and of the second output from said second detecting means applied to said first control means, and for calculating the number of revolutions of a rotating portion of said compressor on the basis of the third output from said third detecting means applied to said first control means;

an AC power source means; and second control means connected between said power source means and said compressor, for controlling an output from said power source means, applied to a motor for driving said compressor, in response to said magnitude of the load torque and to said number of revolutions, thereby controlling an output torque of said motor and said number of revolutions.

5. A torque control apparatus according to claim 4, wherein said second control means includes an inverter which is adapted to control said output from said power source in response to said number of revolutions.

6. A torque control apparatus according to claim 4, wherein said first detecting means includes a temperature sensor means.

7. A torque control apparatus for a compressor, the torque control apparatus comprising:

first detecting means for detecting temperature of said condenser and said evaporator;

said detecting means for detecting a rotational position of a rotating portion of said compressor;

third detecting means for detecting environmental temperature of said evaporator;

first control means for calculating a magnitude of a load torque and a generation time thereof applied to said compressor in dependence upon the first output from said first detecting means and of the second output from said second detecting means applied to said first control means, and for calculating the number of revolutions of a rotating portion of said compressor in dependence upon the third output from said third detecting means applied to said first control means;

an AC power source means; and second control means connected between said power source means and said compressor, for controlling an output from said power source, applied to a motor for driving said compressor, in response to said magnitude of the load torque and to the number of revolutions thereby controlling an output torque of said motor and said number of revolutions.

* * * * *